May 15, 1962 E. W. P. FRANZ 3,034,638
CONVEYOR BELT STRUCTURES
Filed Aug. 26, 1958 4 Sheets-Sheet 1
FIG. 1
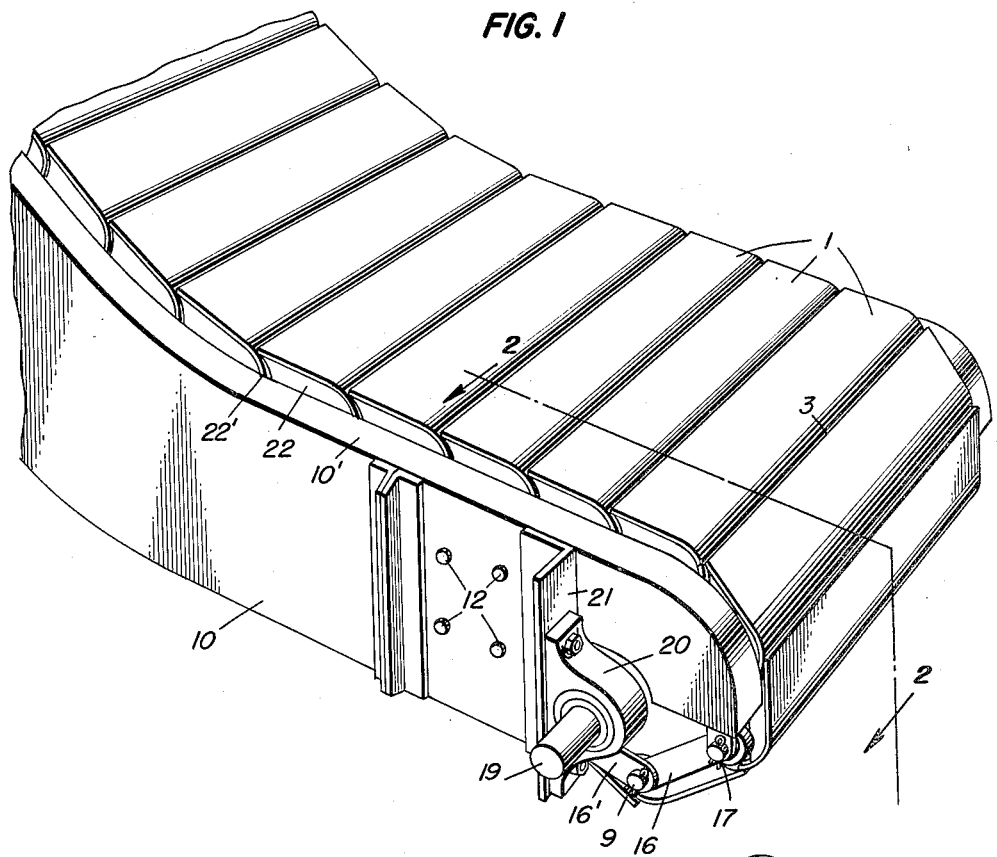
FIG. 4
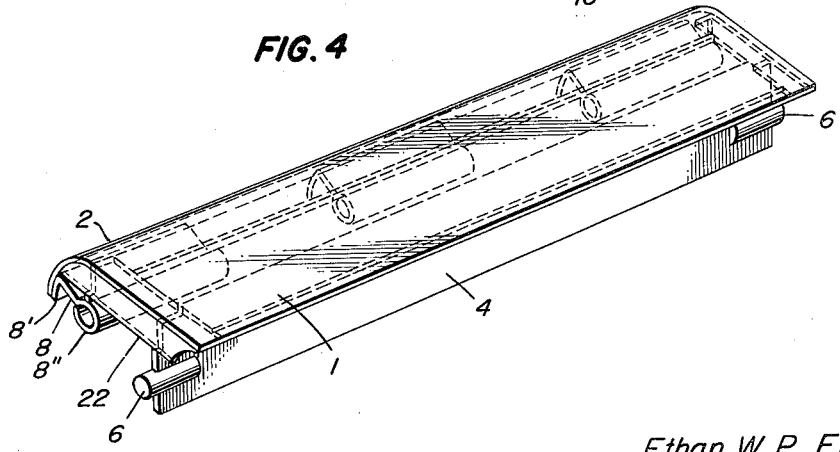
INVENTOR
Ethan W. P. Franz
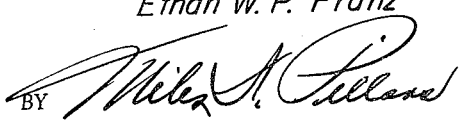
ATTORNEY

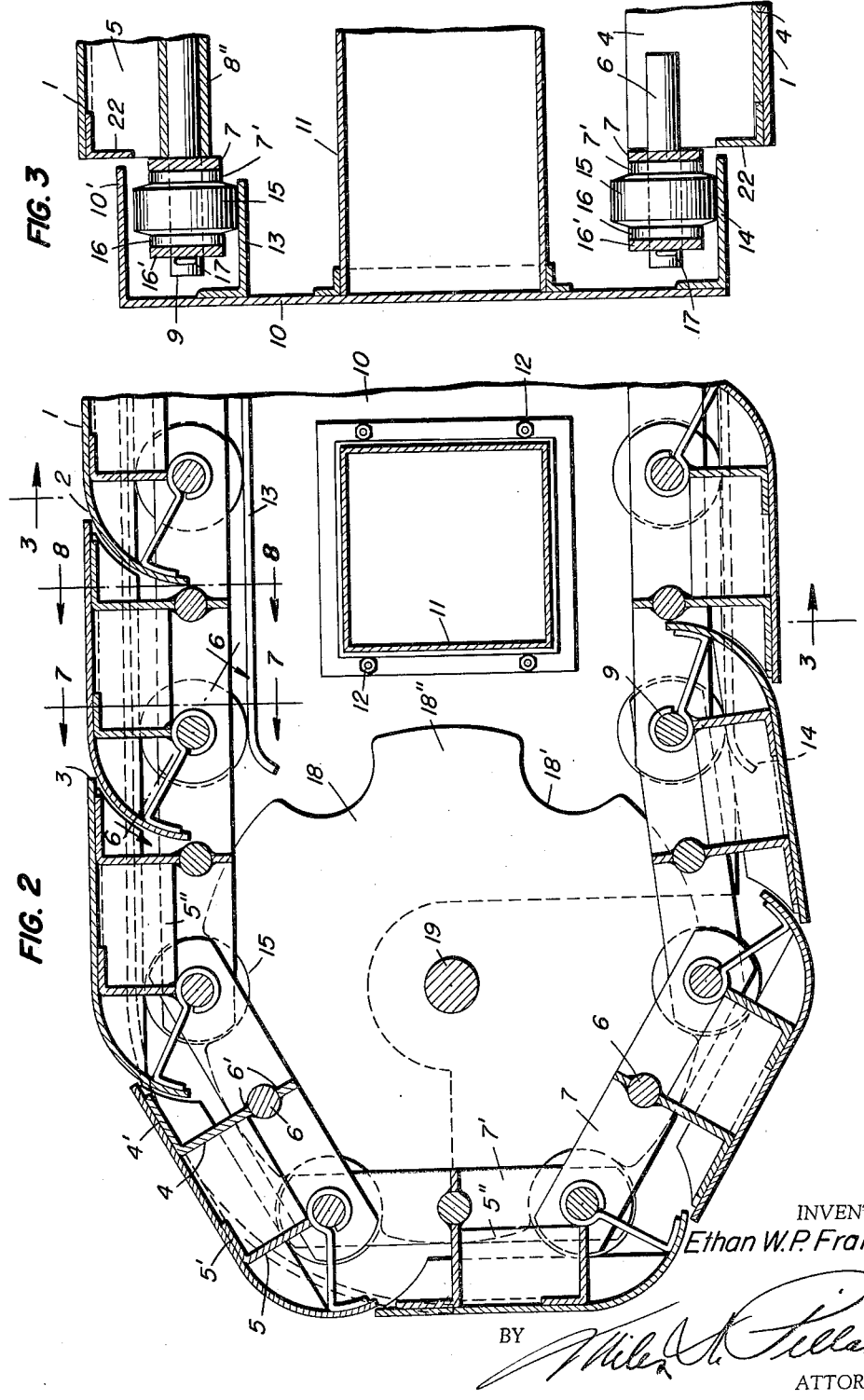

May 15, 1962 E. W. P. FRANZ 3,034,638
CONVEYOR BELT STRUCTURES
Filed Aug. 26, 1958 4 Sheets-Sheet 3
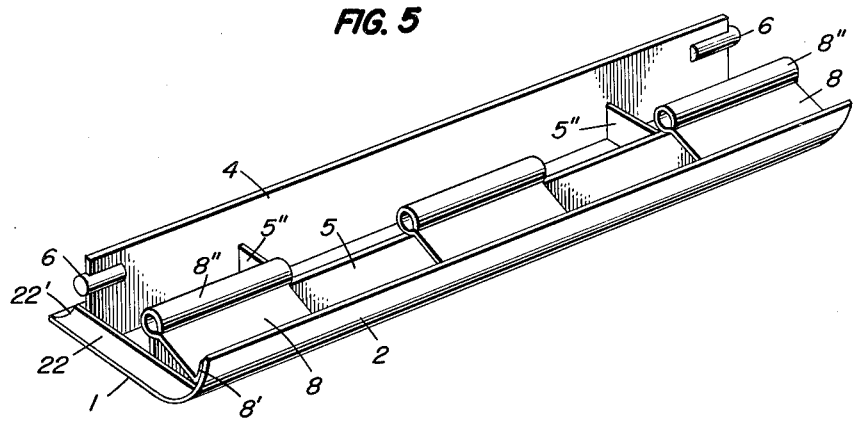
FIG. 5
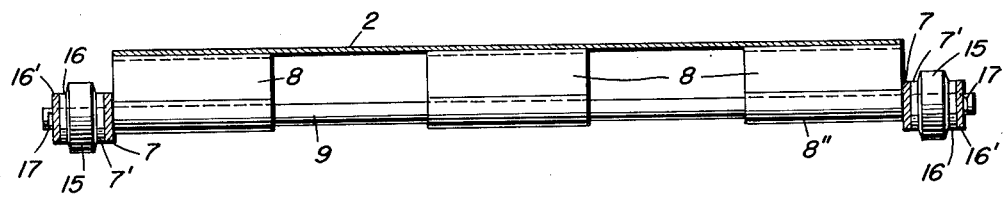
FIG. 6
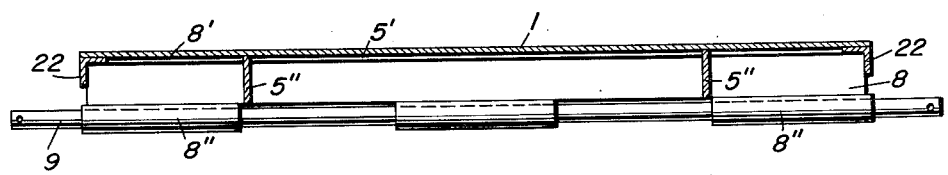
FIG. 7
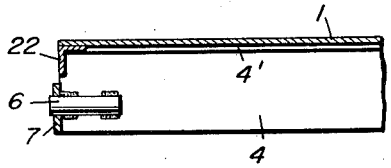
FIG. 8
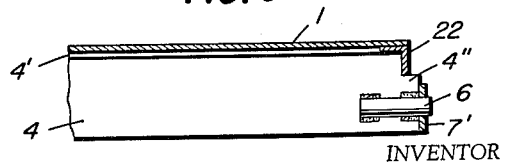
FIG. 9
INVENTOR
Ethan W. P. Franz
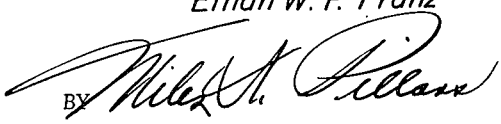
BY
ATTORNEY May 15, 1962 E. W. P. FRANZ 3,034,638
CONVEYOR BELT STRUCTURES
Filed Aug. 26, 1958 4 Sheets-Sheet 4
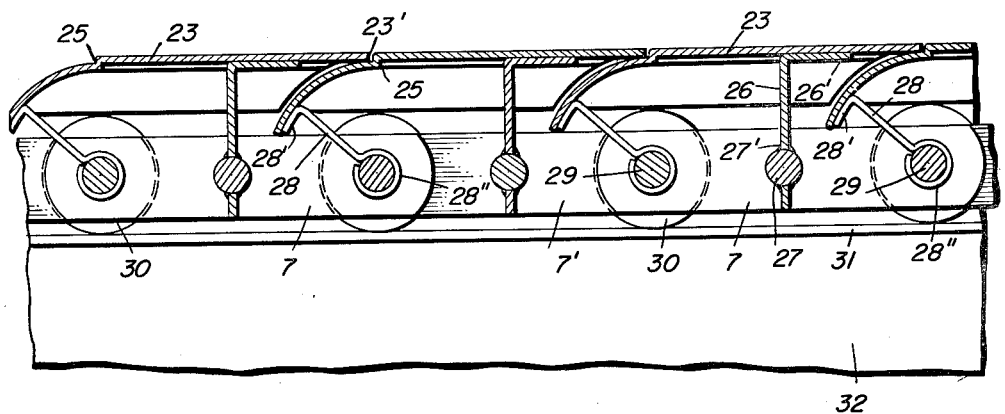
FIG. 10
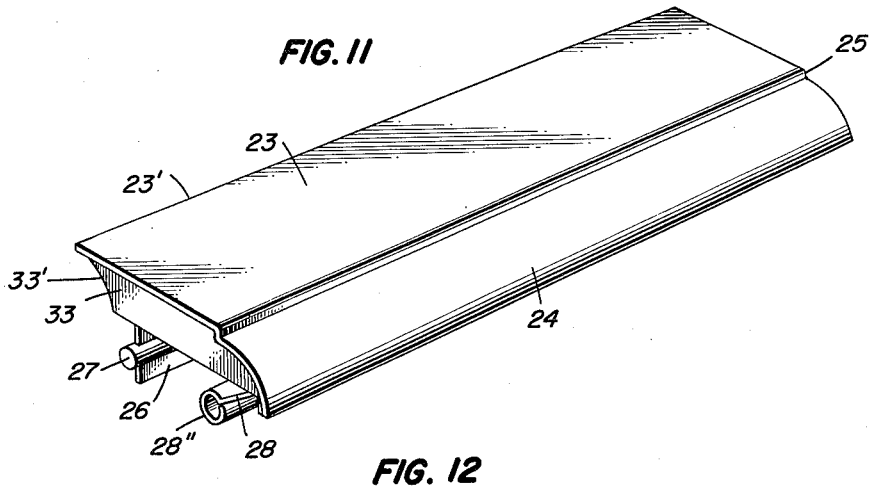
FIG. 11
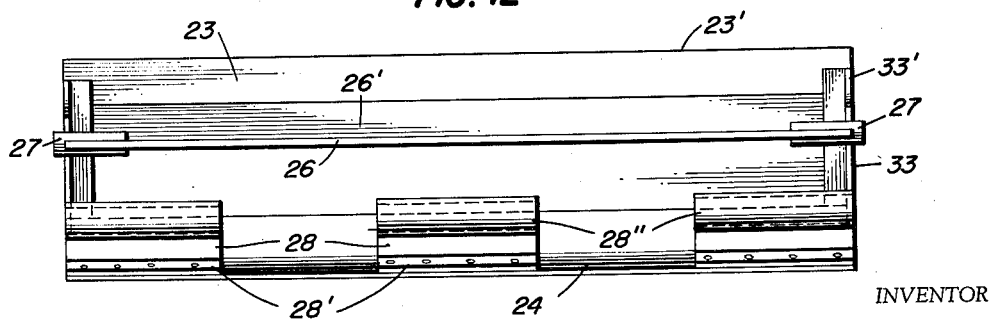
FIG. 12
INVENTOR
Ethan W. P. Franz
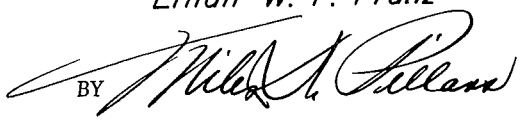
BY
ATTORNEY United States Patent Office 3,034,638
Patented May 15, 1962

3,034,638
CONVEYOR BELT STRUCTURES
Ethan W. P. Franz, Cleveland Heights, Ohio, assignor to May-Fran Manufacturing Company, Cleveland, Ohio, a corporation of Ohio
Filed Aug. 26, 1958, Ser. No. 757,226
11 Claims. (Cl. 198—195)

This invention relates to endless belt conveyor structures and, more particularly, to an improved link belt conveyor formed of a plurality of longitudinally serially arranged links connected together by a driving and supporting arrangement for providing a substantially continuous flat or curvilinear belt surface of superior load-supporting capacity and of improved safe operating quality.

Endless conveyors of various types have been built with serially arranged links for providing substantially continuous load-supporting surfaces and are widely used for transferring ore, coal, grain, packages, and other articles during processing or transferring of such materials from one locality to another. In order to minimize damage to the material being conveyed, as well as to the belt, various configurations of the links of such belts have been provided. It has been found, however, that in conveying certain types of materials it is desirable that the continuous belt surface should be substantially flat or substantially continuously curvilinear, with a minimum of depressions or spaces between the belt links and in the configuration of each belt link. Such a structure minimizes the entrance of foreign material, such as parts of the material which is being conveyed, into the interior of the belt. It also minimizes the possibility of injury to personnel working around such a belt. Generally, such belts have been provided with links which are hingedly connected together or which have parts thereof supported by common hinge pins or pintles. For certain high load capacity belts, such constructions may be at a disadvantage in that the common hinge pins for supporting and connecting adjacent links may not provide the maximum desired support for the load-carrying surface of the belt. Furthermore, special conveyor link constructions provided in the past, which were intended to eliminate or minimize gaps and open spaces between links forming the endless belt, have resulted in rather special and complicated constructions. These make the initial conveyor cost rather high and also require relatively expensive maintenance charges.

According to the present invention, an endless belt conveyor is provided in which the serially arranged links are all individually supported by the belt supporting and driving chains on each side of the belt. In addition, each link is individually formed and arranged relative to adjacent links so as to provide substantially continuous flat and curvilinear load-supporting belt surfaces and also is adapted to be provided with a plurality of reinforced and supporting members, which provide a maximum load-carrying capacity to each link and assures a rigid link construction.

Each individual link is provided with a plurality of load-supporting connections to the supporting and driving chains on each side of the endless belt to provide for a more even distribution of the load on each link, and for a distributed transference of the load on each link to the supporting and driving chains. The load-transmitting connections of each link to the supporting and driving chains preferably are formed by pivotal connections which provide for a maximum freedom of movement between adjacent links which are interconnected by the chains and minimizes friction in the connections of the links to the chains. The configuration of each link and the interrelated arrangement of the links in the assembled belt conveyor to provide for a minimum of openings between the links and along the exposed sides of the belt, so as to provide for a maximum of safety to operating personnel.

It is an object of this invention to provide an improved link type endless belt conveyor of improved and simplified construction, which will have a higher load capacity and provide a safer belt with substantially continuous even exposed belt surfaces.

Another object of this invention is to provide an improved simplified conveyor mechanism having an endless link belt with a substantially even continuous load-supporting belt for facilitating the diversion or plowing-off of small articles from the belt.

A further object of this invention is to provide an improved and simplified link conveyor formed of a series of substantially identical links individually supported by driving chains on each side thereof for increasing the load capacity of the belt, minimizing the initial cost of a conveyor, and facilitating repairs and maintenance at a minimum expense.

An additional object of this invention is to provide a one direction, hold-back or accumulating conveyor for a large variety of finished or semi-finished formed metal parts of light gauge metal, either shorter or longer than the belt conveyor width.

A further object of this invention is to provide an improved conveyor belt having a substantially even load-supporting surface extending above the adjacent belt-supporting framework to allow unobstructed carriage of parts of greater length than the conveyor width.

An additional object of this invention is to provide an improved and stronger link structure for an endless conveyor belt.

A still further object of this invention is to provide a simplified, reinforced, and improved link structure for an endless conveyor belt.

Further objects and advantages of this invention will become apparent from the following description referring to the accompanying drawings, and the features of novelty which characterize this invention will be pointed out with particularity in the claims appended to and forming a part of this specification.

In the drawings:

FIG. 1 is a perspective view of an embodiment of this invention illustrating the general arrangement of an endless belt conveyor mounted to provide a substantially continuous load-carrying belt surface for both flat and curvilinear traverse;

FIG. 2 is an elevational view, in section, of an end of the conveyor belt shown in FIG. 1, taken along line 2—2, and showing the detail construction of the links comprising the belt;

FIG. 3 is a sectional view through one side of the conveyor belt taken along line 3—3 of FIG. 2, and showing the details of the ends of an upper and a lower link and its related supporting structure;

FIG. 4 is a perspective view illustrating the upper side of an improved link made in accordance with this invention and of the type shown in FIGS. 1–3, showing, in phantom lines, the details of the reinforcing and supporting elements of this link;

FIG. 5 is a perspective view illustrating the underside of the link shown in FIG. 4;

FIG. 6 is a transverse sectional view, taken along line 6—6 of FIG. 2, showing structural details of the hinge plate support of one end of the links shown in FIGS. 1–5;

FIG. 7 is a transverse sectional view of the same link shown in FIGS. 4–6, taken along line 7—7 of FIG. 2, and illustrating structural details of the reinforcing and supporting structure of this type link.

FIG. 8 is a sectional view of the same link, as shown in FIGS. 4–7, taken along line 8—8 of FIG. 2, and illustrating an end of the reinforcing and supporting structure of such a link which is adapted to be used for alternate links in the belt;

FIG. 9 is a sectional view, similar to that of FIG. 8, illustrating an end of a link adapted to be used as alternate links of the belt, between links of the type shown in FIG. 8;

FIG. 10 is a fragmentary longitudinal sectional view of another embodiment of an improved link conveyor made in accordance with this invention, and providing for a further improvement in the continuity of the load-supporting surface of the belt, where such belts provide substantially only flat load-carrying surfaces;

FIG. 11 is a perspective view of an improved link of the type forming the conveyor belt shown in FIG. 10; and FIG. 12 is a plan view of the underside of a conveyor belt link of the type shown in FIGS. 10 and 11.

Referring to the drawings, an embodiment of an improved endless belt conveyor made in accordance with this invention is illustrated in FIGS. 1–9 in which the load-supporting surface of the belt provides a substantially continuous surface for both straight and curved stretches and is particularly useful where material is to be raised or lowered from one working level to another. In this construction, the elements of the conveyor belt are structurally reinforced and individually connected to belt carrying and supporting chains on each side of the belt to provide a maximum of strength with a minimum of openings both in the load-carrying surface of the belt and on the sides thereof, thereby providing a maximum of safety for operating personnel.

In this belt, each link is substantially the same and is formed with a continuous flat main load-carrying portion 1 with an integral curved apron 2 extending along one transverse edge thereof, preferably on the trailing side of the link. Successive links in the belt are arranged with the straight leading edge 3 thereof extending over the apron 2 of the adjacent preceding link. This is more clearly shown in FIGS. 1 and 2. The load-carrying capacity of each link is substantially increased by providing a pair of transversely-extending longitudinally-spaced reinforcing plate members 4 and 5. Both of these reinforcing members preferably are in the form of L section plates with the base or short flanges 4' and 5' of the plates 4 and 5 rigidly secured to the underside of the main load-carrying portion 1 of each link. The rigid connection between the flanges 4' and 5' of the reinforcing members to the link portion 1 can conveniently be made by suitable spot welds through these members or by line welds along the edges of the flanges 4' and 5' abutting the underside of the link portion 1.

The rigidity of each link and its load-carrying capacity is further increased by the arrangement of longitudinally extending reinforcing plates 5" on the underside of the load-carrying portion 1 secured to the adjacent inner sides of the transverse reinforcing plates 4 and 5 and to the underside of the link portion 1. These longitudinal reinforcing plates 5" preferably are welded to the reinforcing plates 4 and 5 and to the undersurface of the link portion 1 by line welds extending along the edges of the reinforcing plates 5". In the illustrated construction, two of these longitudinal reinforcing plates are provided, however, in some arrangements, one of these plates may be adequate and, in certain instances, it may be desirable to use more than two transversely spaced reinforcing plates 5". This construction further assures an even distribution of the load throughout the link and its supporting structure.

Each link of the belt is adapted to be independently supported on both sides thereof by a pair of driving and supporting chains, and the connections between the links of the belt and the chains preferably are formed by pivotal connections in order to minimize friction in the connections and in order to insure a maximum of independent action of each link of the belt. These pivotal connections preferably are formed by separate pin connections adjacent to each corner of each link, so as to obtain a relatively uniform distribution and support of the load on each link and a substantially uniform transfer of the load from the link to the chains which support and drive the belt. These pivotal connections can conveniently include a pin 6 inserted in a closely fitting slot in each side edge of the reinforcing plate member 4 and rigidly secured thereto as by welding 6'. Each pin 6 is of such a length as to project axially beyond the outer side edge of the reinforcing plate 4 a distance sufficient to have a pivotal load transmitting engagement with a journal opening in a chain side bar 7 or 7' on the inner side of the supporting and driving chains on each side of the belt.

It will be appreciated that the chains are formed with bars with overlapping ends, so that alternate chain bars 7 are arranged nearer to the side edges of belt links, while the intermediate chain bars 7' are spaced from the side edges of the belt links substantially the thickness of the chain bars 7. With such a construction it is therefore essential that provision be made to assure against side play between the chain bars 7' and their associated belt links, which might result if the space between the chain bars 7' and the adjacent side edges of the reinforcing plates 4 were spaced apart. Such side play is prevented by extending the lower part 4" of the reinforcing plates 4 of alternate belt links substantially the thickness of the chain bars 7 beyond the side edges of the belt links, as shown in FIG. 9. This can best be seen by a comparison of the structures in FIGS. 8 and 9. As there shown, alternate links in the endless belt are formed with slightly different side edges for the reinforcing plate members 4 in order to provide for the proper engagement of the supporting pins 6 with the chain bars 7 and 7'. With such a construction, there is substantially no side play between the belt links and the supporting chain bars 7 and 7', and the pins 6 provide for the efficient transfer of load on the forward part of the load-carrying portion 1 of the links to the supporting chain bars 7 and 7'.

In order to reinforce the apron on each belt link and to provide for the efficient transfer of load on the trailing portion of each belt link to the supporting chains, each link also is provided with a plurality of transversely spaced hinge plates 8. These hinge plates are formed with curved flanges 8' having an outer curvature substantially on the same radius as the inner curvature of the aprons 2 and are arranged in engagement with the underside of these aprons and rigidly secured thereto in any suitable manner, as by spot welding or by line welding the edges of the flanges 8' to the underside of the aprons 2. A load-transmitting hinged connection is provided between the apron side of each belt link and the supporting chains by forming the edge of each hinge plate 8 away from the flange 8' into a substantially cylindrical section 8", arranged in transverse alignment with the adjacent inner edge of the reinforcing plate 5. This adjacent inner edge of the reinforcing plate 5 and the cylindrical portion 8" of the hinge plate are rigidly secured together in any suitable manner, as by line welding the adjacent surfaces thereof, thereby further strengthening the belt link structure. A hinge pin or pintle 9 is arranged with a snug pivotal turning engagement in the cylindrical portions 8" of the hinge plates and in journal openings in both of the inner chain bars 7 and 7' and provides an efficient pivotal load-transmitting connection of the belt link to the supporting chains. The outer edges of the curved portions 8" of the outer hinge plates extend outwardly, as shown in FIGS. 3 and 6, into engagement with the inner surface of the chain bars so as to assure against end play between the belt links and the chain bars. This also provides for a more quietly operating construction and minimizes wear of the relatively movable parts of the assembly.

The conveyor belt is adapted to be supported on any suitable frame, which may include rigid side enclosing frame plates 10 on each side of the belt, suitably held together and reinforced by transversely extending hollow beams 11 secured to the plates in any suitable manner, as by bolts 12. This supporting frame is provided with upper and lower mounting tracks 13 and 14, respectively, which are rigidly secured to the inner side of the frame plates 10 in any suitable manner, as by welding. The conveyor belt is guided and supported upon the mounting tracks 13 and 14 by rollers 15, which are part of the supporting chain structure and are rotatably mounted on each side of each belt link on the hinge pins 9 between the inner chain bars 7 and 7' and outer chain bars 16 and 16'. As is more clearly shown in FIG. 3, the inner chain bars 7 and 7 extend over the hinge pins 9 into engagement with the outer edges of the outer hinge plates 8 and the rollers 15 are rotatably mounted on the hinge pins 9 on the outer sides of the chain bars 7'. The rollers 15 are secured in position on the hinge pins by overlapping ends of outer chain bars 16 and 16', held in position in any suitable manner, as by cotter pins 17 extending through suitable holes in the ends of the hinge pins 9. In this manner, each belt link is individually supported on the side chains by its own respective pins 6 and 9, and adjacent belt links are relatively movable and pivotally connected through the pivotal connections of their respective hinge pins 9 to the chain bars on both sides of the belt. Furthermore, as shown in FIGS. 2 and 3, the load on the belt is transmitted to the supporting frame through the rollers 15 which ride upon the upper surfaces of the mounting tracks 13 and 14, thereby transmitting the load from the belt to the supporting frame through a relatively low friction rolling contact.

In order to assure a substantially continuous even outer belt surface, both for straight and curved stretches of the belt, the apron 2 are formed with a curvature which is substantially arcuate on a center of curvature coinciding with the axis of the hinge pins 9 and the leading edge of each belt link extends over the apron 2 of the adjacent belt link to a position where the underside of the leading edge 3 has a close clearance with the outer surface of the apron 2 of the adjacent belt link. This construction provides for the relative movement of adjacent links around a convex stretch of belt, such as is formed at the return loop in the belt, as shown in FIG. 2, and also provides for a limited concave curvature in the belt surface, as shown in FIG. 1, thereby providing for the raising and lowering of a load from one level to another.

In order to drive the link belt, a suitable sprocket wheel 18 is mounted on a drive shaft 19 journaled in bearings 20 supported by mounting posts 21 secured to the frame plates 10. The drive shaft is adapted to be supplied with power from any suitable source for driving the sprocket wheel 18, and this power is adapted to be transmitted from the sprocket wheel to the conveyor belt through the supporting and driving chains on each side of the belt. The driving power is conveniently transferred from the sprocket wheel 18 to the chains by providing the sprocket wheel 18 with recesses 18' formed as seats for the rollers 15 and spaced around the periphery of the sprocket wheel a distance equal to the spacing between adjacent rollers 15. The recesses 18' form sprocket teeth 18" which engage the sides of the rollers 15 so as to transfer power from the sprocket wheel 18 to the rollers 15, which in turn transmit this power to the conveyor belt through the hinge pins 9. In order to obtain a balanced drive, the conveyor belt preferably is provided with a sprocket wheel 18 on each side of the belt arranged in engagement with each of the driving and mounting chains.

A substantially totally enclosed construction of the conveyor belt is further assured by providing an enclosing skirt 22 on each side of each link extending substantially from the underside of the load-supporting surface thereof to adjacent to the load-transmitting pins 6 and 9.

In order to assure a maximum enclosure of the assembly without interference between relatively movable parts, the leading edge 22 of the skirt 22 is curved on a radius slightly larger than the outer radius of the apron 2 so as to provide a slight working clearance between this edge 22' and the outer surface of the apron 2 of the adjacent belt link, while providing a substantially closed surface for preventing the passage therebetween of foreign matter of any substantial size. In order further to assure a substantially complete enclosure of all driving parts of the conveyor belt and to provide a conveyor for unobstructedly carrying articles of greater length than the width of the conveyor, the rollers 15 do not extend to the upper surface of the belt and the frame plates 10 also extend just slightly beyond the tops of the rollers with an upper enclosing flange 10' extending over the adjacent chain on the side of the belt and into close proximity with the outer surface of the skirts 22 on the conveyor belt links. This is more clearly illustrated in FIGS. 1 and 3 and permits unobstructed overhang of articles longer than the belt width.

In most instances it will be found desirable to operate the belt with the aprons 2 on the leading side of the belt links, however, such a direction of operation of the conveyor belt is not essential to its proper functioning, as it can also be operated in the reverse direction with the aprons on the trailing side of the conveyor belt. Where relatively small articles are to be carried by the belt and where the articles are to be removed by a mechanical diverter it is desirable to drive the belt as a one direction operation with the aprons on the leading side of the belt links. This is also the most advantageous mode of operation where the conveyor may be used with means for holding back or accumulating articles thereon, as it eliminates the possibility of catching parts of the articles in interstices between links.

FIGS. 10–12 illustrate another embodiment of the present invention. In this construction, the endless belt conveyor is of the same general type as that shown in FIGS. 1–9 and includes a modification of the conveyor belt links which provides a high strength structure of relatively lighter weight than that of the first embodiment. This construction of the belt also is adapted to utilize a plurality of longitudinally serially arranged links which are hingedly secured together through a supporting chain arranged on each side of the belt.

The belt is comprised of individual links formed with substantially flat main load-carrying portions 23 with an arcuately curved apron 24 along one transverse edge thereof. An important feature of this embodiment is the connection of the apron 24 to the main load-carrying portion 23 by an offset 25. The offset portion 25 extends at substantially right angles to the main load-carrying portion 23 and has an offset width of substantially the thickness of the plate material of which the belt link is made. This type of construction allows for a closer fit between adjacent links of the belt and further minimizes openings in the load-carrying surface of the belt by providing for a more complete overlap of the straight outer edge 23' of the main load-carrying portion 23 of each link with the apron 24 on the adjacent belt link. FIG. 10 more clearly illustrates the close clearance which can be provided between the outer edge 23' of the load-carrying portion of each link with the adjacent upper surface of the apron 24 on the adjacent link and with the outer surface of the offset 25 on this adjacent link. It should be noted that while this belt provides a more continuous even load-carrying surface for this type of conveyor belt, it is not practical, when utilizing such a belt, to utilize it for transferring loads from one level to another in that such a belt cannot be used to form concave curves, as the leading edge 23' of the belt links would jam against the outer surface of the offset 25 of the adjacent belt link and prevent the formation of such a concave curve. If it were desired to utilize this type offset link in a belt having a concave stretch, it would be necessary to shorten the flat main load-carrying portion 23 of each belt link so as to provide sufficient clearance between the outer edge 23' and the offset 25 of the adjacent link to enable the belt to traverse the desired concave curve. Such an arrangement would be practical in some circumstances for carrying certain types of loads. However, it should be noted that with such a construction a definite gap would be formed between each pair of links.

The offset 25 in this embodiment of the invention not only provides for a more complete continuity of the load-carrying surface of the belt in straight stretches thereof, but also provides a greater transverse rigidity to each link due to the right angle rib effect which is provided by the offset 25. This additional rigidity and strength provided by the offset 25 makes it possible to reduce the overall weight of each link by eliminating one of the transverse reinforcing plate members used in the link construction shown in FIGS. 1–9. In the present embodiment, the link is provided with a transversely extending reinforcing plate member 26 which is preferably an L section member having its short side or flange 26' arranged in an engagement with the underside of the main load-carrying portion 23 of the belt link. This reinforcing member 26 is rigidly secured to the link portion 23 in any suitable manner, as by spot welds through the portion 23 and the flange 26' or by line welding the edges of the flange 26' to the underside of the link portion 23. As in the previously described construction, the transverse reinforcing plate is adapted to have a pivotal load-transmitting connection with the chain on each side of the belt, and this is conveniently provided by arranging a short pin 27 in a close fitting aperture in each side edge of the reinforcing member 26 and rigidly securing the pin 27 in this aperture, as by line welding it to the adjacent edges of the reinforcing member, as shown at 27'. As in the previously described embodiment of this invention, alternate belt links will require that the pins 27 extend outwardly from the edges of the reinforcing member 26 sufficiently to engage journal openings in adjacent inner chain bars 7, and intermediate links will require that the reinforcing plates 26 be formed as shown in FIG. 9, so that the pins 27 will extend outwardly into supporting engagement with journal openings in the intermediate chain bars 7'.

An even distribution of the load on each belt link further is provided for, and adjacent links are hingedly secured together by a plurality of transversely spaced hinge plates 28 similar to those in the prior described embodiment of this invention. These hinge plates 28 also act as reinforcing plate members for strengthening the apron side of the belt links and are secured to each belt link in longitudinally spaced relation to the reinforcing plates 26. Each hinge plate is formed with a short flange 28' on one edge thereof arranged in engagement with the curved underside of the apron 24 of its respective belt link and is rigidly secured thereto in any suitable manner as by spot welding or by line welding the edges of the flange 28' to the underside of the apron 24. The end of each hinge plate away from the flange 28' is formed with a cylindrical portion 28", which extends substantially parallel to the main load-carrying portion 23 of the belt link and is substantially parallel to the pivot pins 27 on the reinforcing plate member 26.

Load is adapted to be transmitted from the belt link portion adjacent to the hinge plates 28 to the supporting chains on each side of the belt through the hinge plates by a pivotal connection of the hinge plates to the side chain bars. This pivotal connection is formed by a hinge pin or pintle 29, which is arranged with a close turning fit within the cylindrical portion 28" of the reinforcing hinge plates 28 and is provided with a pivotal load-transmitting connection with the supporting chain bars in journal openings therein. These hinge pins 29 also extend through supporting rollers 30 and secure these rollers in position between chain bars in a manner similar to that described with reference to the preceding embodiment of this invention and illustrated in detail in FIGS. 3 and 6. These rollers 30 are adapted to engage a supporting track 31, which is suitably mounted on an enclosing supporting frame 32. This frame 32 may conveniently be made similar in structural detail to the enclosing supporting frame shown in FIGS. 1, 2, and 3.

As in the preceding embodiment of this invention, operating personnel are adapted to be protected and the operating parts of the conveyor belt are adapted to be shielded from foreign substances by substantially totally enclosing the relatively movable driving and supporting parts of the conveyor belt. This can be commodiously provided by forming the enclosing mounting frame 32 with a flange portion adapted to extend to the sides of the conveyor belt and also over the driving and supporting chains, including the rollers 30, in a manner similar to flange 10' shown in FIG. 3.

In order further to assure substantially complete enclosure of the operating mechanism of the belt, each link is provided with a longitudinally extending skirt 33 on each side thereof. These skirts 33 extend from the under surface of the belt link portions 23 and aprons 24 and are rigidly secured thereto in any suitable manner, as by line welding along the engaging surfaces of the skirts 33 and the link portions 23 and aprons 24. As is more clearly shown in FIGS. 10 and 11, the edge 33' of the skirt 33, adjacent to the apron 24 of the adjacent belt link, has an arcuate contour formed on a radius slightly longer than the radius of the outer surface of the adjacent apron 24, so as to provide a slight working clearance therebetween.

A belt of this construction is adapted to be driven by any suitable source of power through the chains on each side of the belt. Such a drive may conveniently be provided by a suitable sprocket wheel and drive shaft structure similar to that shown in FIG. 2.

While this embodiment utilizes the hinge plates 28 as a second transversely extending means of reinforcement for the belt links, an additional reinforcing plate member, similar to that shown in connection with the embodiment of this invention illustrated in FIGS. 1–9, and provided with longitudinally extending connecting reinforcing plates, can also be provided. In most instances these latter additional reinforcing members will not, however, be required because of the reinforcement provided by the offset 25 or reinforcing members of different shapes may be found desirable. Belts of various widths can readily be provided by simply using standard links or parts thereof transversely aligned and connected together by the hinge pins and suitably long reinforcing members.

While particular embodiments of this invention have been illustrated and described, modifications thereof will occur to those skilled in the art. It is to be understood, therefore, that this invention is not to be limited to the particular arrangements disclosed, and it is intended in the appended claims to cover all modifications within the spirit and scope of this invention.

I claim:
1. An endless load-supporting belt comprising a plurality of longitudinally serially arranged links, each of said links including a load-supporting member having a substantially flat portion and a curved apron extending therefrom and integrally connected thereto, said apron being substantially straight transversely of said link and curved in the longitudinal direction of the belt, at least one reinforcing plate member extending transversely of each link, said reinforcing member having a rigid connection to the underside of said load-supporting member, means including a pair of driving and supporting chains arranged one on each side of said belt, pin means for forming a load-transmitting connection between said reinforcing member and said belt supporting chain means, hinge plate means rigidly connected to each of said curved aprons and providing a load-transmitting pivotal connection of said hinge plate means to said belt supporting chain means, all of said links being arranged with the aprons on the same respective sides thereof, and each apron arranged to extend under the adjacent side of the flat portion of the adjacent link opposite the apron thereon with the upper surface of the apron in close proximity to the under-edge of said adjacent side whereby a substantially continuous outer belt surface is provided.

2. An endless load-supporting belt comprising a plurality of longitudinally serially arranged links, each of said links including a load-supporting member having a substantially flat portion and an apron extending therefrom, said apron being substantially straight transversely of said link and curved substantially arcuately longitudinally of said link, a pair of transversely extending longitudinally spaced reinforcing members rigidly connected to the underside of said flat portion of said load-supporting member, means including a pair of driving and supporting chains arranged one on each side of said belt, pin means for forming a load-transmitting connection between one of said reinforcing members on each load-supporting means and said chains, a plurality of transversely extending hinge plates secured to the underside of each apron and having a hinge pin for forming a pivotal connection thereof to said chains, means rigidly securing an edge of the other of said reinforcing plates to said hinge plates, the center of curvature of said curved apron being substantially coaxial with the pivotal axis of said hinge plate, all of said links being serially arranged with the aprons on the same respective sides thereof, and each apron arranged to extend under the adjacent side of the flat portion of the adjacent link opposite the apron thereon with the under-edge of said adjacent side in close proximity to the upper surface of the apron whereby a substantially continuous outer belt surface is provided.

3. A link for an endless load-supporting belt including a load-supporting member having a substantially flat portion and an apron extending therefrom, said apron being substantially straight transversely of said link and curved substantially arcuately longitudinally of said link, and a pair of transversely extending longitudinally spaced reinforcing members, each of said reinforcing members having a rigid connection to the underside of said load-supporting member and provided with means for forming a pivoted load-transmitting connecting with a belt supporting and driving means, the pivotal axis of one of said load-transmitting connections being coincident with the center of curvature of said curved apron.

4. A link for an endless load-supporting belt, said link including a load-supporting member having a substantially flat portion and a curved apron extending therefrom and integrally connected thereto, said apron being substantially straight transversely of said link and curved in the longitudinal direction of the belt, a reinforcing member extending transversely of the link, said reinforcing member having a rigid connection to the underside of said load-supporting member, pin means for forming a load-transmitting connection between said reinforcing member and a belt supporting means on both sides of said link, and a set of hinge plates rigidly connected to said curved apron and providing a load-transmitting pivotal connection of said hinge plates to the belt supporting means.

5. A link for an endless load-supporting belt, said link including a load-supporting member having a substantially flat portion and a curved apron extending therefrom and integrally connected thereto, said apron being substantially straight transversely of said link and curved in the longitudinal direction of the belt, and a pair of reinforcing members extending transversely of the link and spaced in a direction longitudinally of the belt, each of said reinforcing members having a rigid connection to the underside of said load-supporting member, pin means for forming a load-transmitting connection between each of said reinforcing members and a belt supporting means on both sides of said link, one of said load-transmitting connections including a hinge plate rigidly connected to said curved apron and to one of said reinforcing members and providing a load-transmitting pivotal connection of said latter reinforcing member to the belt supporting means.

6. A link for an endless load-supporting belt, said link including a load-supporting member having a substantially flat portion and a curved apron extending therefrom and integrally connected thereto, said apron being substantially straight transversely of said link and curved in the longitudinal direction of the belt, a pair of reinforcing plate members extending transversely of the link and spaced in a direction longitudinally of the belt, each of said reinforcing members having a rigid connection to the underside of said substantially flat load-supporting portion, longitudinally extending reinforcing plates rigidly connecting said pair of transverse reinforcing members, means for forming a load-transmitting pivotal connection between each of said reinforcing members and a belt supporting means, and a hinge plate rigidly connected to said curved apron and to one of said reinforcing members and providing the load-transmitting pivotal connection of said latter reinforcing member to the belt supporting means.

7. A link for an endless load-supporting belt including a load-supporting member having a substantially flat portion and an apron extending therefrom, said apron being substantially straight transversely of said link and curved substantially arcuately longitudinally of said link, a pair of transversely extending longitudinally spaced reinforcing plate members rigidly connected to the underside of said flat portion of said load-supporting member, one of said reinforcing plate members extending substantially along the juncture of said flat portion and said curved apron, means for forming a load-transmitting connection between said reinforcing plate members and a belt supporting and driving means, a transversely extending hinge plate secured to the underside of said apron and having a pintle for forming a pivotal connection between said link and the belt supporting means and providing one of said load-transmitting connections, and means rigidly securing the edge of said one of said reinforcing plate members away from said juncture to said hinge plate, the center of curvature of said curved apron being substantially coaxial with the pivotal axis of said hinge plate around said pintle.

8. A link for an endless load-supporting belt, said link including a load-supporting member having a substantially flat portion and a curved apron extending therefrom and integrally connected thereto, said apron being substantially straight transversely of said link and curved in the longitudinal direction of the belt, reinforcing members extending transversely of the link and spaced in a direction longitudinally of the belt, each of said reinforcing members having a rigid connection to the underside of said load-supporting member, pin means for forming a load-transmitting connection between each of said reinforcing members and a belt supporting means on both sides of said link, and one of said pin means comprising a set of hinge plates rigidly connected to said curved apron and providing a load-transmitting pivotal connection of said hinge plates to the belt supporting means.

9. A link for an endless load-supporting belt driven by a pair of spaced chain devices comprising a member extending transversely of the chain devices and having a flat portion with an upper load-supporting surface and a curved portion at one transverse edge thereof with the curved portion being bent downwardly and away from the load-supporting surface, a pair of pins depending downwardly from the underside of said flat portion and adapted for pivotal connection to said chain devices, a hinge element secured to the underside of said member, and a hinge loop on the hinge element with the pivotal axis of the hinge loop being coincident with the center of curvature of said curved portion, said hinge loop being adapted to receive a hinge pin extending transversely between the chain devices.

10. A link for an endless load-supporting belt driven by a pair of spaced chain devices comprising a member extending transversely of the chain devices, said member having a flat portion with an upper load-supporting surface and a curved portion at one transverse edge thereof with the curved portion being bent downwardly and away from the load-supporting surface, at least one transversely-extending load reinforcing element secured to the underside of said member, pins on the opposite ends of said reinforcing element, said pins being adapted for pivotal connection to said chain devices, a hinge element secured to the underside of the member, and a hinge loop on the hinge element with the pivotal axis of the hinge loop being coincident with the center of curvature of said curved portion, said hinge loop being adapted to receive a hinge pin extending transversely betwen the chain devices.

11. In combination with a pair of endless spaced chain devices each of which comprises a plurality of serially-connected link elements which are pivotally connected one to the other, the combination of an endless load-supporting belt including a plurality of longitudinally serially-arranged load-supporting members, each of said members extending transversely of the chain devices and having a flat portion with an upper load-supporting surface and a curved portion at one transverse edge thereof with the curved portion being bent downwardly and away from the load-supporting surface, a pair of pins depending downwardly from said load-supporting member, said pins being connected to a pair of link elements in the spaced chain devices intermediate successive pivotal connections of said link elements, a hinge element secured to the underside of the member, a hinge loop on the hinge element with the pivotal axis of the hinge loop being coincident with the center of curvature of said curved portion, and a hinge pin extending through said hinge loop and extending transversely between the chain devices, the axis of said hinge pin being coincident with the axis of an associated pivotal connection between said link elements.

References Cited in the file of this patent

UNITED STATES PATENTS

| | | |
|---|---|---|
| 516,702 | Franklin | Mar. 20, 1894 |
| 1,136,578 | Ayres | Apr. 20, 1915 |
| 1,758,397 | Harber | May 13, 1930 |
| 1,824,756 | Welser | Sept. 22, 1931 |
| 2,628,705 | Kline et al. | Feb. 17, 1953 |